United States Patent
Schriver

(10) Patent No.: US 10,576,480 B2
(45) Date of Patent: Mar. 3, 2020

(54) STACKED SPRAY DISC ASSEMBLY FOR A FLUID INJECTOR, AND METHODS FOR CONSTRUCTING AND UTILIZING SAME

(71) Applicant: Continental Automotive Systems, Inc., Auburn Hills, MI (US)

(72) Inventor: Timothy Schriver, Newport News, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 129 days.

(21) Appl. No.: 15/467,227

(22) Filed: Mar. 23, 2017

(65) Prior Publication Data

US 2018/0272365 A1  Sep. 27, 2018

(51) Int. Cl.
| | |
|---|---|
| *B05B 1/02* | (2006.01) |
| *F02M 51/06* | (2006.01) |
| *B05B 1/30* | (2006.01) |
| *F16K 47/08* | (2006.01) |
| *F02M 61/18* | (2006.01) |
| *F02M 61/12* | (2006.01) |
| *F02M 61/16* | (2006.01) |

(52) U.S. Cl.
CPC .............. *B05B 1/3053* (2013.01); *B05B 1/02* (2013.01); *F02M 51/0671* (2013.01); *F02M 51/0675* (2013.01); *F02M 61/12* (2013.01); *F02M 61/165* (2013.01); *F02M 61/186* (2013.01); *F16K 47/08* (2013.01); *F02M 61/188* (2013.01)

(58) Field of Classification Search
CPC ............. F02M 61/188; F02M 51/0675; F02M 61/165; F02M 61/12; F02M 51/0671; F02M 61/186; F16K 47/08

USPC .................... 239/533.12, 554, 555
See application file for complete search history.

(56) References Cited

U.S. PATENT DOCUMENTS

| | | | |
|---|---|---|---|
| 5,484,108 A | 1/1996 | Nally | |
| 5,570,841 A | 11/1996 | Pace et al. | |
| 5,765,750 A | 6/1998 | Pace | |
| 5,862,991 A * | 1/1999 | Willke | F02M 51/0671 239/397.5 |

(Continued)

FOREIGN PATENT DOCUMENTS

| | | |
|---|---|---|
| DE | 69509889 T2 | 10/1999 |
| DE | 69718325 T2 | 8/2003 |

(Continued)

OTHER PUBLICATIONS

International Search Report and the Written Opinion of the International Searching Authority for corresponding PCT Application No. PCT/U5201 8/023552, dated Aug. 29, 2018.

*Primary Examiner* — Jason J Boeckmann

(57) ABSTRACT

A spray disc arrangement for a fluid injector includes a first disc having a dimple with an orifice defined through the dimple. A second disc includes a dimple and a plurality of orifices defined through the dimple. The first disc dimple is received in the second disc dimple. The second disc includes a plurality of channels defined along a concave surface of the dimple, with the plurality of orifices located in the channels. The first disc and the second disc are coupled together such that a convex surface of the dimple of the first disc contacts a concave surface of the dimple of the second disc. The first disc is disposed along a downstream side of a valve seat of the fluid injector.

10 Claims, 9 Drawing Sheets

(56) References Cited

U.S. PATENT DOCUMENTS

| | | | |
|---|---|---|---|
| 6,170,762 B1 | 1/2001 | Sumida et al. | |
| 6,173,914 B1 * | 1/2001 | Hopf | F02M 51/0682 239/583 |
| 6,202,936 B1 | 3/2001 | Frick | |
| 6,854,448 B2 | 2/2005 | Okamoto et al. | |
| 6,854,670 B2 | 2/2005 | Sumisha et al. | |
| 6,886,758 B1 | 5/2005 | Wieczorek et al. | |
| 7,191,961 B2 | 3/2007 | Okamoto et al. | |
| 7,222,407 B2 | 5/2007 | Sayar | |
| 7,469,845 B2 | 12/2008 | Sayar | |
| 8,342,430 B2 | 1/2013 | Ohno et al. | |
| 8,882,003 B2 | 11/2014 | Okamoto et al. | |
| 8,888,021 B2 | 11/2014 | Yasukawa et al. | |
| 9,309,853 B2 | 4/2016 | Okamoto et al. | |
| 9,587,608 B2 * | 3/2017 | Jeannel | B05B 1/3436 |
| 2002/0190143 A1 | 12/2002 | Fochtman et al. | |
| 2003/0234005 A1 | 12/2003 | Sumisha et al. | |
| 2013/0175367 A1 | 7/2013 | Okamoto et al. | |
| 2015/0337785 A1 | 11/2015 | Kawasaki et al. | |

FOREIGN PATENT DOCUMENTS

| | | |
|---|---|---|
| DE | 112013006953 T5 | 1/2016 |
| EP | 2857671 A1 | 4/2015 |

* cited by examiner

STACKED SPRAY DISC ASSEMBLY FOR A FLUID INJECTOR, AND METHODS FOR CONSTRUCTING AND UTILIZING SAME

FIELD OF INVENTION

The present invention generally relates to a spray disc assembly for controlling fluid spray patterns from a fluid injector, and particularly to such a spray disc assembly which provides spray patterns that are off-axis relative to a longitudinal axis of the fluid injector and that are highly atomized.

BACKGROUND

Highly atomized spray patterns for low pressure injection are commonly created by using channels in the fluid flow at the exit orifice(s) of the fluid injector. Alternatively, the fluid is directed by channels to impinge fluid flows and create a higher turbulence at the exit orifices. Generally, the channels that direct the fluid flow are formed in a disc. The upper bound of the channel is closed by positioning the disc against a flat surface on the injector seat. Single or multiple orifices in the disc may be utilized but the fluid spray patterns from the orifices combine in one coherent pattern, largely parallel to the fluid injector's longitudinal axis. This limits the possibility to direct the exiting fluid stream in any direction other than substantially parallel to the longitudinal axis of the fluid injector.

Existing fluid injectors further include discs in which the exit orifice(s) thereof is located off-axis relative to the longitudinal axis of the fluid injector. The resulting spray patterns are off-axis relative to the injector's longitudinal axis.

SUMMARY

Example embodiments overcome shortcomings found in existing fluid injectors and provide an improved fluid injector for injecting a spray having a spray pattern that is off-axis and that is highly atomized. According to an example embodiment, a fluid injector includes a body; a fluid passageway through the body and extending from an inlet to an outlet of the fluid injector, a valve seat disposed internally of the body within the passageway; and a valve element that is selectively reciprocated relative to the valve seat to close and open the passageway to flow of fluid by seating and unseating the valve element on and from the valve seat, respectively. The fluid injector further includes at least two disc members disposed in the passageway downstream of the valve seat in a direction of the flow of fluid through the fluid injector. The disc members are arranged in a stack, with each disc including a dimple extending in the direction of the flow of fluid and at least one orifice defined through the dimple. The at least two disc members include a first disc member and a second disc member, the at least one orifice of the first disc member includes an orifice centrally located along the dimple of the first disc member, and the at least one orifice of the second disc member includes a plurality of orifices disposed along the dimple of the second disc member.

In addition, the second disc member includes a plurality of channels, with each orifice of the second disc member being located in a channel. The channels of the second disc member are disposed in the fluid injector so as to face the upstream direction, relative to the direction of the flow of fluid through the fluid injector. The dimple of the first disc member covers a first portion of each channel for preventing fluid from directly entering the first portion, and the orifice of the first disc member leaves a second portion of each channel uncovered such that the fluid directly enters each channel at the second portion thereof and passes through to the first portion of the channel before exiting the at least two disc members through the orifices of the second disc member.

In an example embodiment, the dimple of each of the first and second disc members includes a concave surface and a convex surface disposed along opposed sides of the disc member. The convex surface of the dimple of the first disc member contacts the concave surface of the dimple of a second disc member. In an example embodiment, the dimple of the first disc member includes a frusto-conical shaped dimple and the dimple of the second disc member is a cone shaped dimple. In another example embodiment, the dimple of each of the first and second disc members has a polyhedron shape with major faces of the polyhedron including the channels defined thereon.

Each channel may have at least two channel ends, with the at least two channel ends located in the second portion of the channel and the orifice located in the first portion of the channel. The orifice is located in the channel generally equidistant to the two channel ends.

BRIEF DESCRIPTION OF THE DRAWINGS

Aspects of the invention will be explained in detail below with reference to an exemplary embodiment in conjunction with the drawings, in which.

DETAILED DESCRIPTION

The following description of the preferred embodiment(s) is merely exemplary in nature and is in no way intended to limit the invention, its application, or uses.

Example embodiments are generally directed to a stack of discs disposed at the outlet end of a fluid injector which controls the spray pattern of the fluid discharged from the injector to be off-axis and relatively highly atomized.

Figure 1:
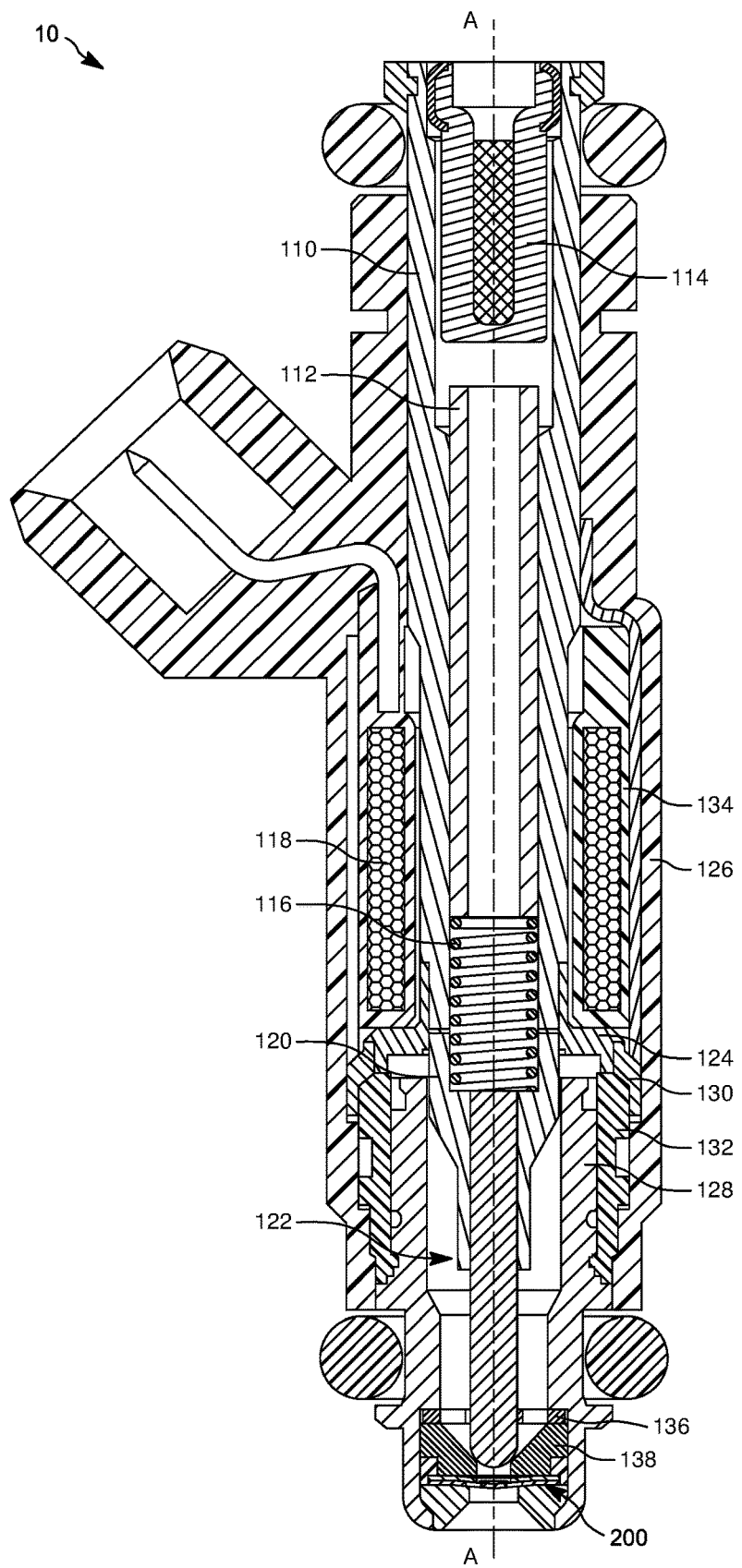
FIG. 1 is a cross-sectional side view of a fluid injector according to an example embodiment.
Figure 1A:
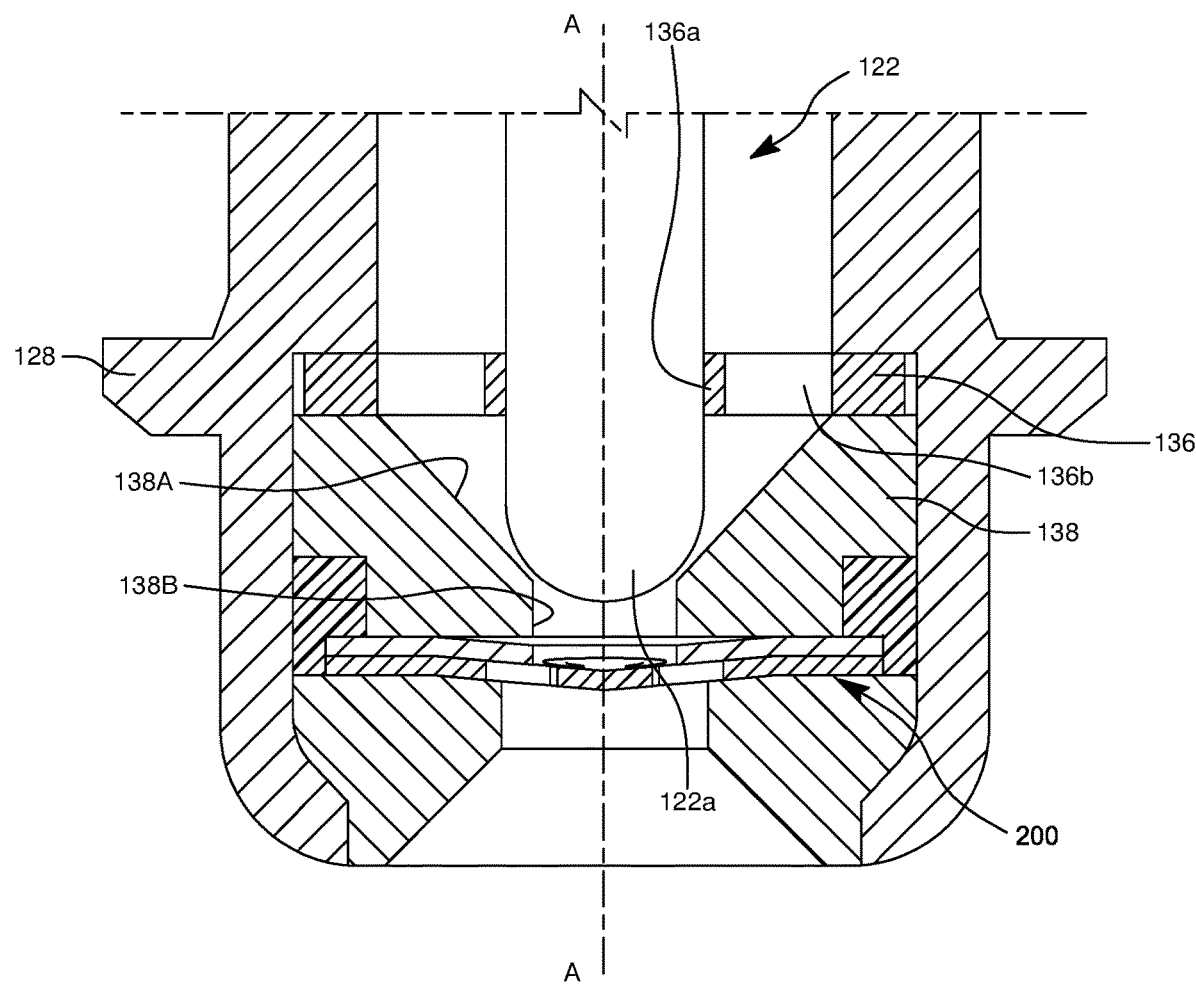
FIG. 1A is an enlarged view of an outlet portion of the fluid injector of FIG. 1.
Figure 2:
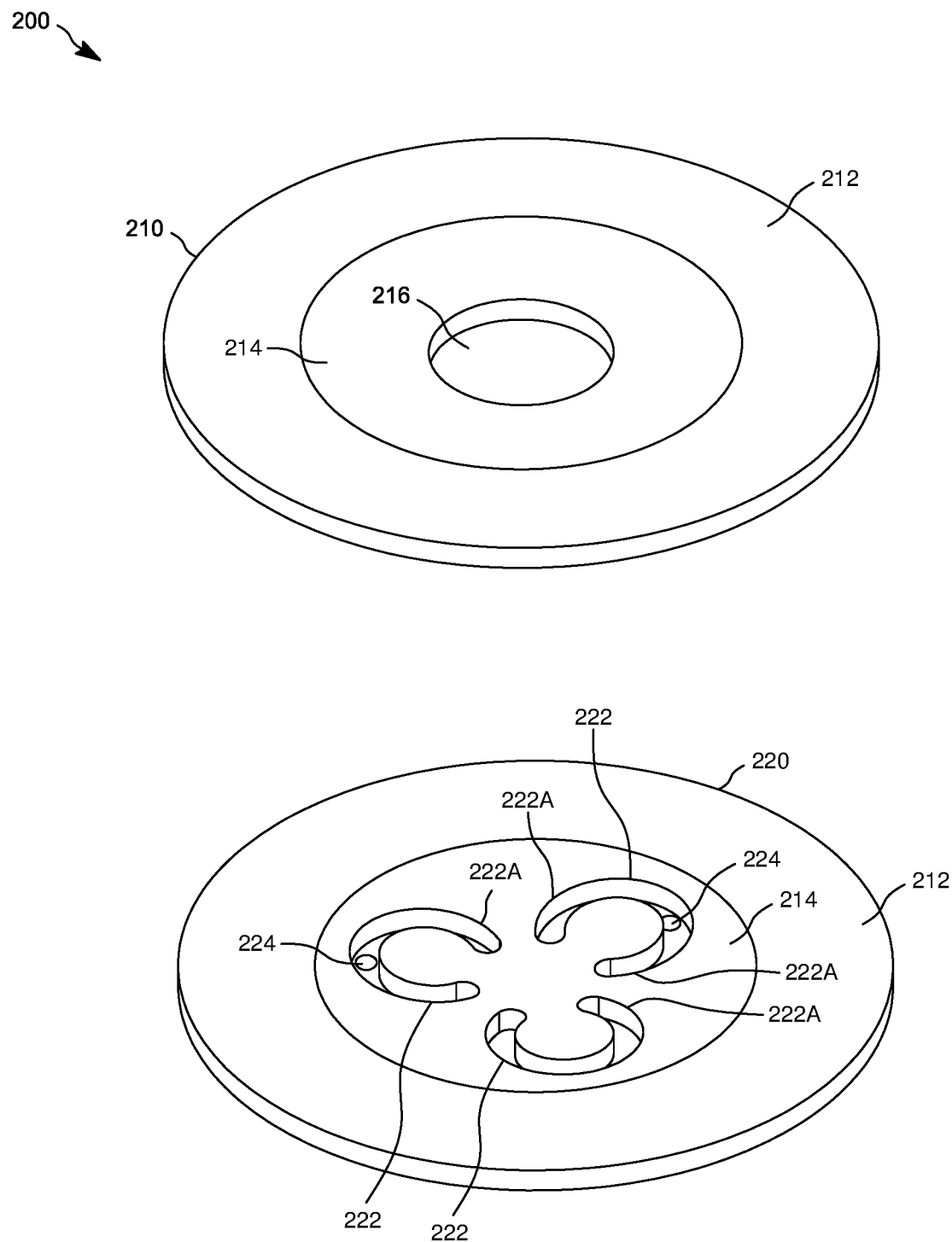
FIG. 2 is an exploded perspective view of a stacked disc assembly for the fluid injector of FIG. 1 according to an example embodiment.

FIGS. 1 and 1A illustrate a fluid injector 10 according to an example embodiment. In particular, fluid injector 10 includes: a fluid inlet tube 110, an adjustment tube 112, a filter assembly 114, a coil assembly 118, a coil spring 116, an armature 120, a closure member assembly 122, a non-magnetic shell 124, a fluid injector overmold 126, a body 128, a body shell 130, a shell overmold 132, a coil overmold 134, a guide member 136 for the closure member assembly 122, a seat 138, and an orifice disc 140. The construction of fluid injector 10 can be of a type similar to those disclosed in commonly assigned U.S. Pat. Nos. 4,854,024; 5,174,505; and 6,520,421, which are incorporated by reference herein in their entireties.

FIG. 1A shows the outlet end of a body 128 of a solenoid-operated fluid injector 10 having a spray disc stack 200 according to an example embodiment. The outlet end of fluid injector 10 includes a guide member 136 and a seat 138, which are disposed axially interiorly of spray disc stack 200. The guide member 136, seat 138 and spray disc stack 200 can be retained by a suitable technique such as, for example, by welding the spray disc stack 200 to the seat 138 and welding the seat 138 to the body 128.

Seat 138 can include a frusto-conical shaped seating surface 138A that leads from guide member 136 to a central passage 138B of the seat 138 that, in turn, leads to spray disc stack 200. Guide member 136 includes a central guide opening 136A for guiding the axial reciprocation of a sealing end 122A of a closure member assembly 122 and several through-openings 136B distributed around opening 136A to provide for fluid to flow into the sac volume. The fluid sac volume is the encased volume downstream of the needle sealing seat perimeter, which in this case is the volume between the interface of sealing end 122A and seating surface 138A, and the metering orifices of spray disc stack 200. FIG. 1A shows the hemispherical sealing end 122A of closure member assembly 122 seated on sealing surface 138A, thus preventing fluid flow from fluid injector 10.

FIGS. 2-7 illustrate spray disc stack 200 according to an example embodiment. Spray disc stack 200 includes first disc member 210 and second disc member 220. Disc members 210 and 220 are constructed from a metal or metal composition and have stamped features defined thereon. First and second disc members 210, 220 are coupled together to form a single, integrated stack 200. First disc member 210 is disposed upstream of second disc member 220, relative to a direction of fluid flow through fluid injector 10. As can be seen, each disc member 210, 220 includes a flat annular portion 212 and a dimple 214. Annular portion 212 circumferentially surrounds dimple 214 of each disc member 212, 220. Dimple 214 is centrally located along disc members 212, 220 and extends in the direction of fluid flow through injector 10. In spray disc stack 200, dimple 214 of first disc member 210 is disposed within dimple 214 of second disc member 220, with the convex surface of dimple 214 of first disc member 210 contacting the concave surface of dimple 214 of second disc member 220.

In the example embodiment shown in FIGS. 2-7, dimples 214 of disc member 210, 220 are similarly sized and shaped. As illustrated, dimple 214 of first disc member 210 has a frusto-conical shape and dimple 214 of second disc member 220 has a cone shape. In particular, the frusto-conical shape and the cone shape may be between about 20 degrees and about 75 degrees relative to the flat portion 212 of disc members 210, 220. It is understood, however, that dimple 214 of disc members 210, 220 may have other shapes. Dimple 214 of disc members 210, 220 facilitate spray patterns through spray disc stack 200 which are off-axis relative to a longitudinal axis of fluid injector 10 and which are highly atomized, as discussed in greater detail below.

First disc member 210 includes an orifice 216 defined through a central portion of dimple 214. The size (diameter) of orifice 216 largely matches the size (diameter) of central passage 138B of valve seat 138 at the downstream surface thereof. As illustrated, orifice 216 has a circular cross-section but it is understood that orifice 216 may have other shapes depending upon the shape and location of features of second disc member 220, as discussed below. First disc member 210 is disposed against a lower surface of valve seat 138 such that flat portion 212 of first disc member 210 forms a seal with valve seat 138. As a result, fluid flowing through valve seat 138 of fluid injector 10 passes only through orifice 216 of first disc member 210.

Figure 3:
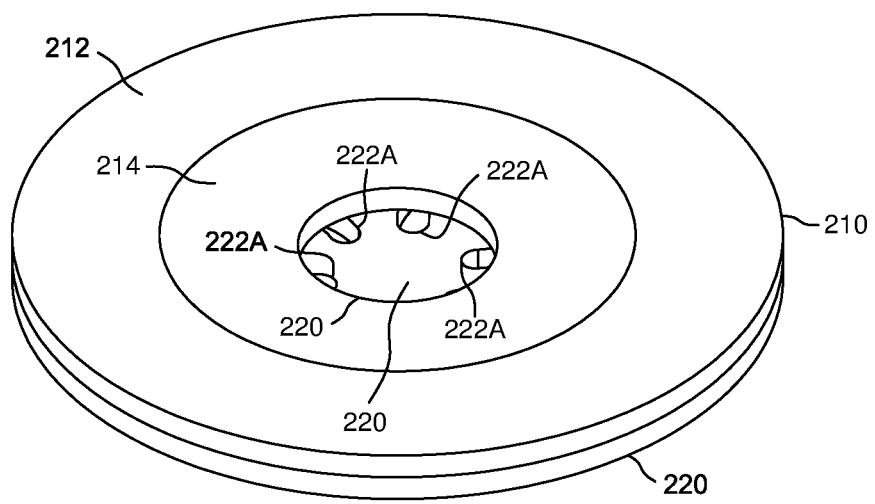
FIGS. 3 and 4 are perspective and top views, respectively, of the stacked disc assembly of FIG. 2.
Figure 4:
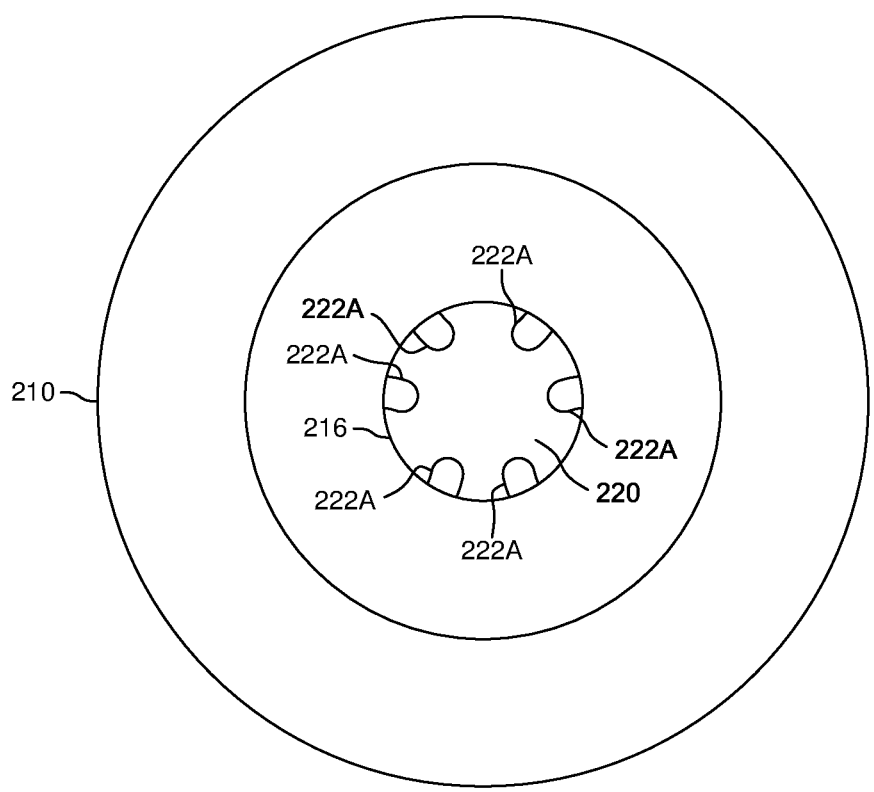
Figure 5:
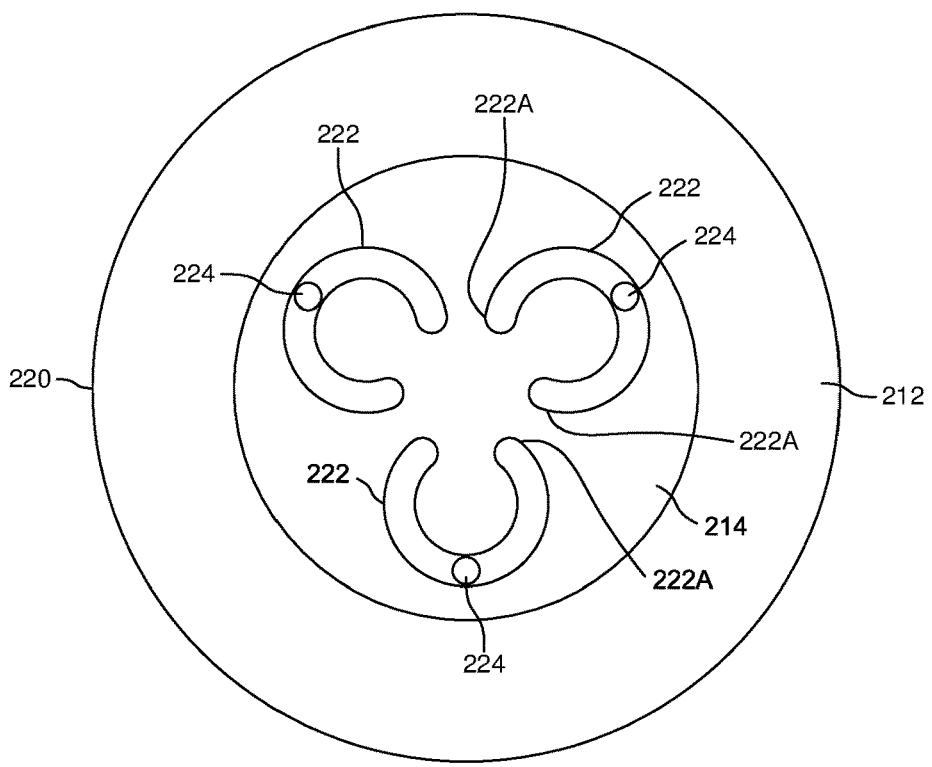
FIG. 5 is a top view of a disc member of the stacked disc assembly of FIG. 2.
Figure 6:
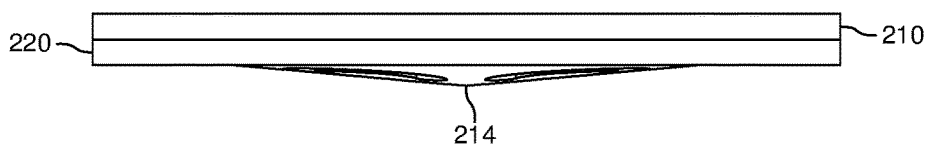
FIG. 6 is a side view of the stacked disc assembly of FIG. 2.
Figure 7:
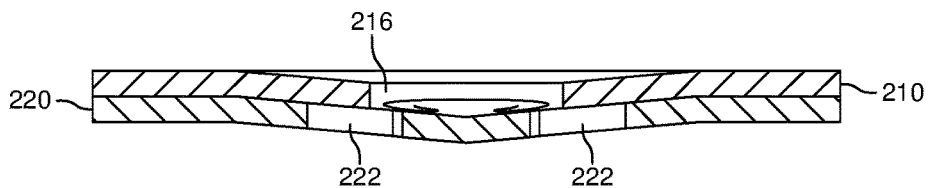
FIG. 7 is a side cross sectional view of the stacked disc assembly of FIG. 2.

Second disc member 220 includes one or more channels 222 defined along the upstream, concave surface of dimple 214 of second disc member 220. In the illustrated example embodiment, second disc member 220 includes a plurality of channels 222, such as three channels, that are symmetrically spaced along dimple 214. Each channel 222 includes at least one orifice 224 which is defined through second disc member 220. Each channel 222 further includes a first portion which is covered by first disc member 210 and a second portion which is positioned adjacent orifice 216 of first disc member 210 so as to be uncovered, as shown in FIGS. 3 and 4. Each orifice 224 is located in the first portion of its corresponding channel 222, and in one example embodiment orifice 224 is disposed furthest away from the second portion of channel 222. In this way, fluid passing through spray disc stack 200 assumes a fluid flow path which passes through orifice 216 of first disc member 210, by entering the second portion of channels 222 of second disc member 220 and flowing through channels 222 before exiting spray disc stack 200 via orifices 224.

This fluid flow path through spray disc stack 200 advantageously allows for an improved spray exiting fluid injector 10. Specifically, by placing orifices 224 along dimple 214 of second disc member 220, and by constraining fluid to flow along and through a major portion of each channel 222 before exiting spray disc stack 200 through orifices 224, the fluid exiting spray disc stack 200 (and from fluid injector 10) assumes a spray pattern that is in a direction which is off-axis relative to the longitudinal axis A of fluid injector 10. With second disc member 220 including multiple channels 222 defined along the concave surface of dimple 214 of second disc member 220, multiple off-axis fluid streams are created with spray that is highly atomized.

In the example embodiment illustrated in FIGS. 2-7, each channel 222 is substantially U-shaped having ends 222A which are radially inwardly disposed towards the center of dimple 214 (relative to a remainder of channel 222) so as to be in the second portion of channel 222 that is adjacent orifice 216 of first disc member 210. Orifice 224 is located in the base of the U-shape of channel 222, equally or substantially equally spaced from each end 222A. Alternatively, it is understood that channel 222 may have other shapes, including a first portion that is covered by first disc member 210 and includes orifice 224 and a radially inwardly disposed second portion having only one end or three or more ends. The particular shape and size of channels 222, the number of channels 222 and the spacing thereof about dimple 214 may be selected based upon the particular fluid spray requirements of the system in which fluid injector 10 is to be utilized.

Further, the depth of channels 222 may vary between the first and second portions thereof. Specifically, the depth of the first portion of channel 222 (that is covered by and adjacent to first disc member 210) may be deeper than the depth of the second portion of channel 222 (adjacent orifice 216 of first disc member 210) near the ends 222A thereof. By way of one example, the difference in channel depth may be about ten microns.

Figure 13:
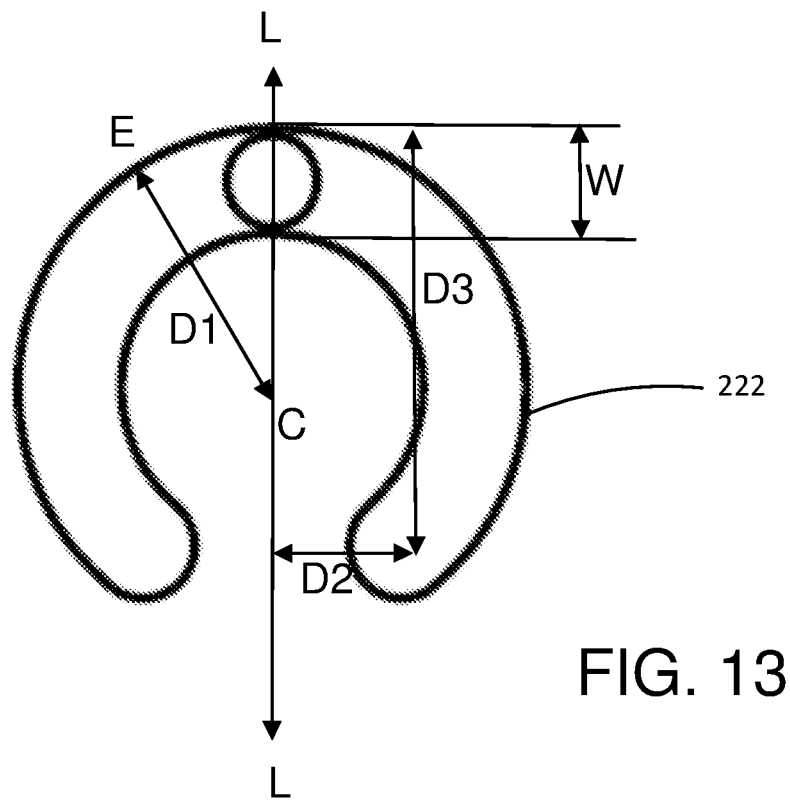
FIG. 13 is a top view of a channel in the disc member of FIG. 5.

In an example embodiment of channel 222 (FIG. 13), a dimension D1 from a location that is near a center C which is largely surrounded by channel 222 to a radially outer edge E of channel 222 is about 0.021 inches, and a width W of channel 222 near orifice 224 is about 0.008 inches. From a line L which bisects channel 222, a distance D2 to a center of channel 222 near an end 422A is about 0.001 inches, and a distance D3, in a direction parallel to line L measured from an outer radial edge of channel 222 to the center of channel 222 near end 422A is about 0.020 inches. It is understood that the dimensions of channels 222 may vary based in part upon system requirements and particularly system spray requirements for the system in which fluid injector 10 is utilized.

Figure 8:
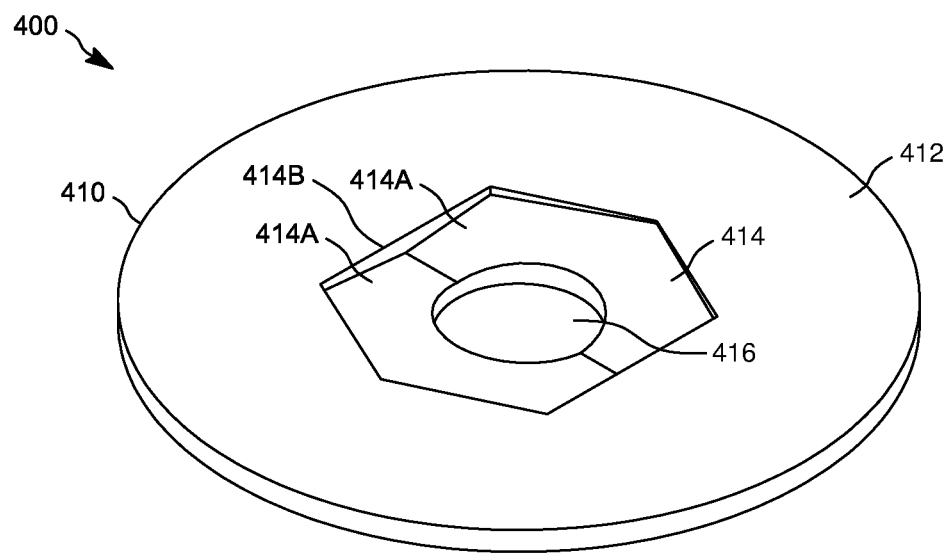
FIG. 8 is an exploded perspective view of a stacked disc assembly for the fluid injector of FIG. 1 according to another example embodiment.
Figure 8:
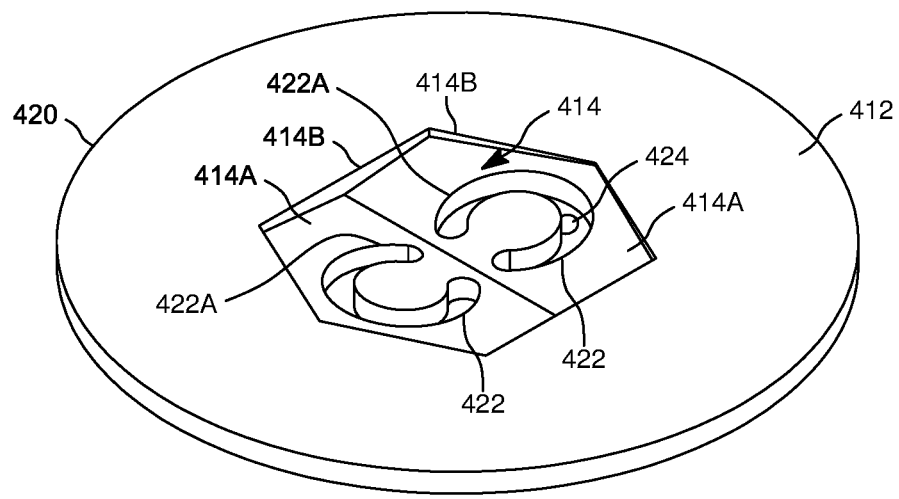
Figure 9:
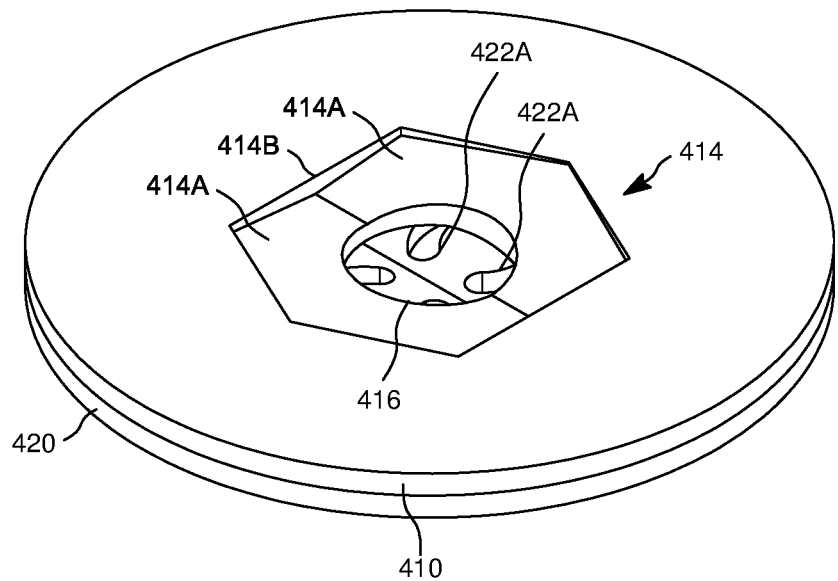
FIGS. 9 and 10 are perspective and top views, respectively, of a disc member of the stacked disc assembly of FIG. 8.
Figure 10:
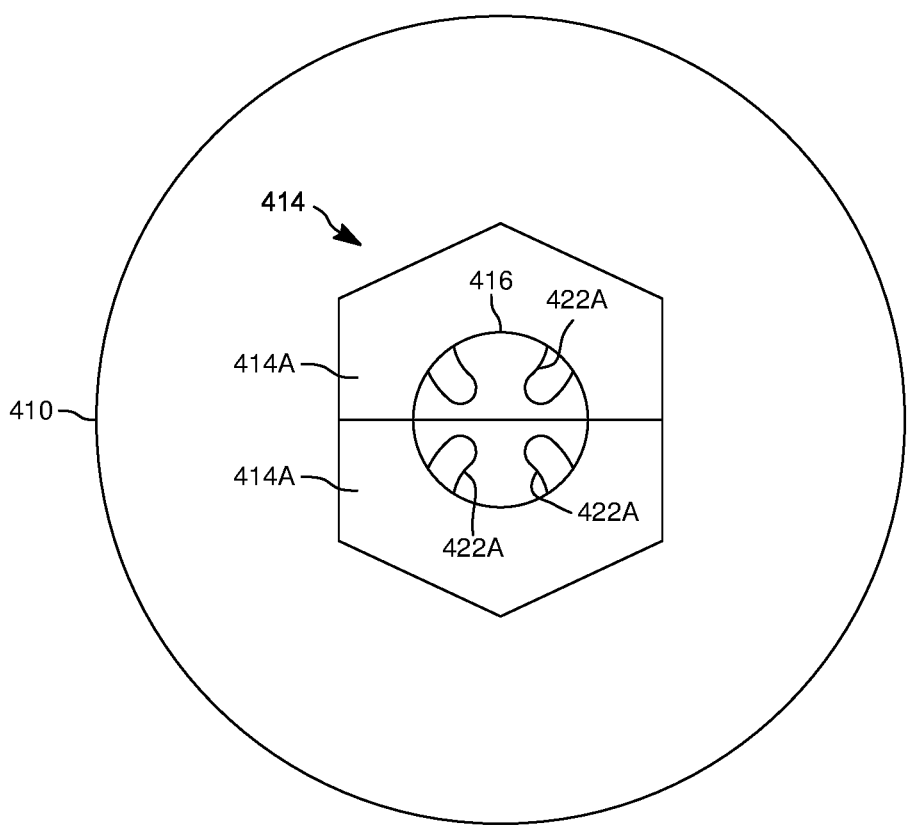
Figure 11:
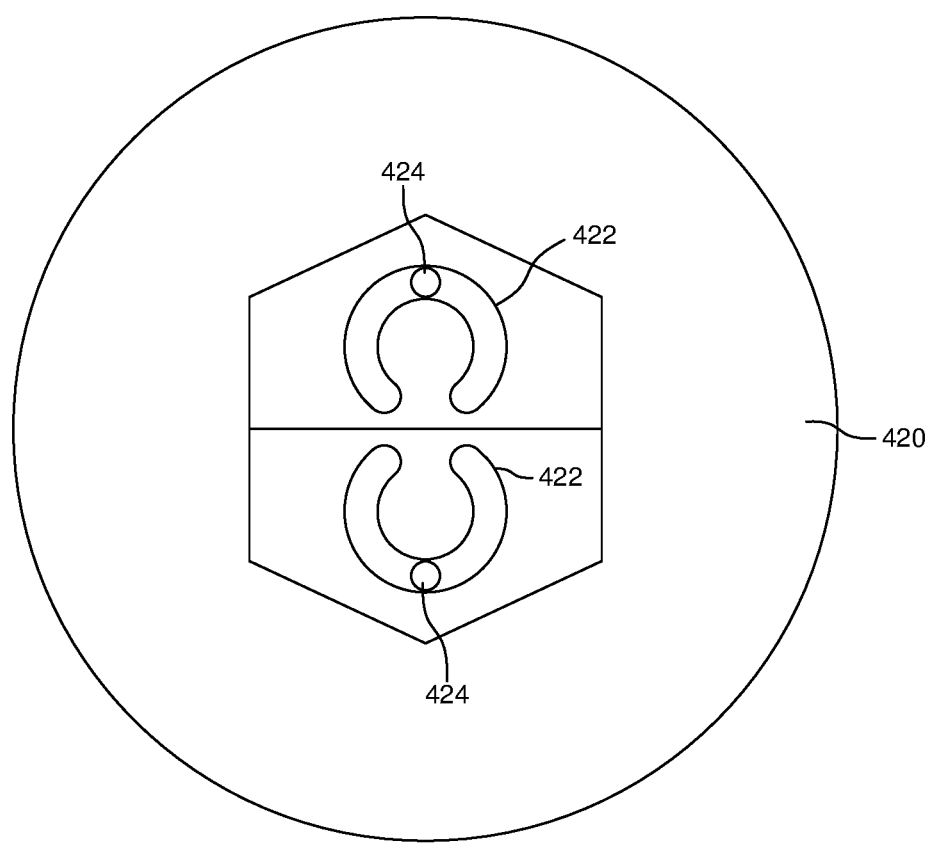
FIG. 11 is a top view of a disc member of the stacked disc assembly of FIG. 8.
Figure 12:
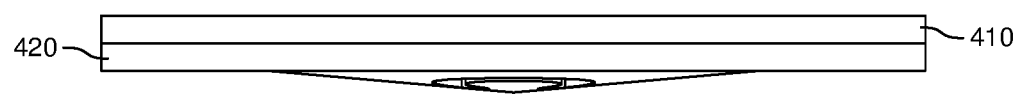
FIG. 12 is a side view of the stacked disc assembly of FIG. 8.

FIGS. 8-12 illustrate spray disc stack 400 according to a second example embodiment. Similar to spray disc stack 200, spray disc stack 400 includes two disc members, first disc member 410 and second disc member 420. Each disc member 410, 420 includes a dimple 414 that is surrounded by an annular flat portion 412 such that dimple 414 is centrally located on disc members 410, 420. Dimple 414 of first disc member 410 and second disc member 420 are similarly sized and shaped, with dimple 414 of first disc member 410 disposed within dimple 414 of second disc member 420. In this embodiment, however, each dimple 414 has a polyhedron shape. Each dimple 414 includes a plurality of flat or planar faces forming the polyhedron shape. Two of the flat faces 414A are major faces and the remaining faces 414B forming the polyhedron shape are minor faces due to the relative size difference between faces 414A and 414B. As shown in FIGS. 8, 9 and 10, each face 414A is shaped as a pentagon and the remaining (minor) faces 414B have triangular or pentagonal shapes. Faces 414A are disposed at an angle relative to the longitudinal axis A and the lateral axis of fluid injector 10. In the example embodiment, each angle between face 414A and flat portions 412 of disc members 410, 420 is between about 20 degrees and about 75 degrees, and particularly between about 25 degrees and about 70 degrees. The surfaces of dimple 414 of first disc member 410 which collectively form a convex surface of dimple 414 contacts the surfaces of dimple 414 of second disc member 420 collectively forming a concave surface of dimple 414 of second disc member 420.

First disc member 410 further includes orifice 416 defined through a central portion of dimple 414, and particularly through faces 414A. Second disc member 420 includes a plurality of orifices 424 defined through faces 414A and a plurality of channels 422 defined along upstream surfaces of faces 414A in which orifices 424 are located. In the illustrated embodiment, each face 414A of dimple 414 of second disc member 420 includes a channel 422 and a corresponding orifice 424. It is understood, however, that each major face 414A of dimple 414 may include more than one channel 422 with at least one orifice 424 located therein.

Similar to channel 222 of second disc member 220, each channel 422 of second disc member 420 is U-shaped having two ends 422A located radially inwardly and nearer a center of dimple 414 relative to a base of the U-shaped channel 422. Orifice 424 is located along the base of the U-shaped channel 422, the same or nearly the same distance away from ends 422A. With second disc member 420 combined with first disc member 410 in a stacked relationship with each other, dimple 414 of first disc member 410 covers a first portion of channels 422 (where orifices 424 are located) so as to prevent fluid from directly entering the first channel portion, and orifice 416 of first disc member 410 is disposed adjacent the second portion of channels 422 (where ends 422A are located), as shown in FIG. 9. This partial covering of channels 422 by dimple 416 of first disc member 410 is such that fluid flowing through fluid injector 10 directly enters channels 422 at ends 422A and flows along most or all of channels 422 before exiting spray disc stack 400 (and fluid injector 10) via orifices 424. With orifices 424 defined through faces 414A which are disposed at an angle relative to the longitudinal axis of fluid injector 10, and with fluid constrained to pass substantially an entire portion along channels 422 before exiting spray disc stack 400 via orifices 424, the fluid discharged from fluid injector 10 in multiple off-axis streams relative to the longitudinal axis thereof, with each stream having highly atomized spray.

Figure 14:
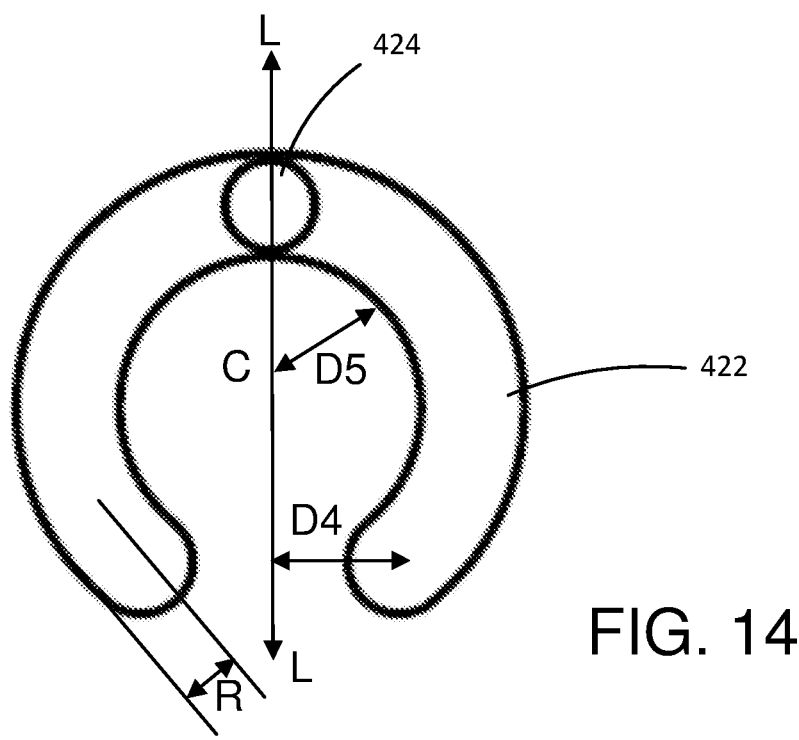
FIG. 14 is a top plan view of a channel of the disc member of FIG. 11.

FIG. 14 illustrates various dimensions of channels 422 according to an example embodiment. The radius R of channel 422 and ends 422A is about 0.17 cm. The lateral distance D4 from a line L which bisects channel 422 and a center of each end 422A is about 0.33 cm (thereby resulting in the distance between the center of the two channels 422A to be about 0.66 cm). The distance D5 from a center position C between and surrounded by channel 422 to an inner edge of the inner portion of channel 422A is about 0.23 cm.

It is understood that dimple 414 may have a shape that is different from the polyhedron shape of FIGS. 8-12 with two major faces 414A that are angled with respect to the longitudinal axis of fluid injector 10.

Spray disc stacks 200 and 400 may further include a latching mechanism which permanently or semi-permanently conjoins together their corresponding disc members. In an example embodiment, one of first disc member 210, 410 and second disc member 220, 420 may include a series of apertures define therethrough and the other of first disc member 210, 410 and second disc member 220, 420 includes a series of extrusions sized and positioned to pass through the apertures when first disc member 210, 410 and second disc member 220, 420 are stacked on top of each other. A staking tool or punch is then used to flatten or otherwise deform the extrusions so as to mechanically conjoin first disc member 210, 410 and second disc member 220, 420. Once conjoined, the first and second disc members are then subject to a punch with creates the dimple for the two discs at the same time. Forming the dimple in the first and second disc members at the same time ensures that the dimples closely align with each other so that the path of fluid flow through channels 222, 422 are tightly controlled.

With second disc member 220 including three channels 222 (each with an orifice 224) equally spaced from each other along conical shaped dimple 214, a relatively highly atomized, off-axis cone-shaped spray pattern provides a largely even, thorough distribution from fluid injector 10. With second member 420 including two channels 422 (each with an orifice 424) that are equally spaced about polyhedron shaped dimple 414, a relatively highly atomized, off-axis split stream pattern is provided.

The example embodiments provide a benefit of allowing for a relatively simple design change to meet the particular requirements of different fluid injectors. Specifically, the first and second disc members can be easily modified to meet virtually any fluid spray requirements of a fluid injector by changing the dimensions of the dimples, the dimensions and number of channels, and the dimensions and number of orifices therein. For example, second disc member 220 may include more or less than the three channels 222 depicted, depending upon the particular fluid flow requirements. Similarly, second disc member 420 may include more or less than the two channels 422 depicted.

Fluid injector 10, including spray disc stacks 200 and 400, may be a fuel injector for injecting fuel into the combustion chamber of a gas combustion engine. Alternatively, fluid injector 10 may be an injector for a reductant delivery unit of a selective catalytic reduction system in which a reductant is injected into the exhaust stream of a vehicle's exhaust line for reducing the vehicle's nitrogen oxide emissions.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A fluid injector for injecting fluid, comprising:
a body;
a fluid passageway through the body and extending from an inlet to an outlet of the fluid injector;
a valve seat disposed internally of the body within the passageway;
a valve element that is selectively reciprocated relative to the valve seat to close and open the passageway to flow of fluid by seating and unseating the valve element on and from the valve seat, respectively; and
at least two disc members disposed in the passageway downstream of the valve seat in a direction of the flow of fluid through the fluid injector, the disc members being arranged in a stack of disc members with each disc member including a dimple extending in the direction of the flow of fluid and at least one orifice defined through the dimple,
wherein the at least two disc members comprises a first disc member and a second disc member, the at least one orifice of the first disc member comprises an orifice centrally located along the dimple of the first disc member and the at least one orifice of the second disc member comprises a plurality of orifices disposed along the dimple of the second disc member, and
wherein the second disc member comprises a plurality of channels, each orifice of the second disc member being located in a channel, the dimple of the first disc member covering a first portion of each channel for preventing fluid from directly entering the first portion, and the orifice of the first disc member leaving a second portion of each channel uncovered such that fluid enters each channel at the second portion thereof and travels along the channel to the first portion thereof before exiting the at least two disc members through the orifices of the second disc member,
wherein the dimple of the first disc member comprises a frusto-conical shape, and the dimple of the second disc member comprises a cone shape, each of the plurality of channels of the second disc member being defined on the cone shaped dimple, and
wherein each channel has at least two longitudinal channel ends, the at least two longitudinal channel ends located in the second portion of the channel and the orifice located in the first portion of the channel, the channels being wholly spaced apart from and unconnected to each other.

2. The fluid injector of claim 1, wherein the dimple of each of the first and second disc members includes a concave surface and a convex surface disposed along opposed sides of the disc member, with the convex surface of the dimple of the first disc member contacting the concave surface of the dimple of a second disc member, and the plurality of channels are defined along the concave surface of the second disc member.

3. The fluid injector of claim 1, wherein the first disc member comprises a planar portion disposed radially outwardly relative to the dimple of the first disc member, a surface of the planar portion of the first disc member is disposed against a downstream surface of the valve seat in sealing relation therewith, the valve seat comprises an orifice defined therethrough, and a diameter of the orifice of the first disc member is the same as the diameter of the orifice of the valve seat at the downstream surface thereof.

4. The fluid injector of claim 1, wherein the orifice disposed in each channel is substantially equally spaced to the at least two channel ends of the channel.

5. The fluid injector of claim 1, wherein each channel is substantially U-shaped.

6. The fluid injector of claim 1, wherein for each channel, a depth of the channel at the second portion thereof is less than a depth of the channel at the first portion thereof.

7. A spray disc assembly for use in fluid injectors, comprising:
a first disc member comprising a flat portion, a dimple extending from the flat portion and an orifice defined through the dimple, the dimple including a convex surface and a concave surface disposed on opposed surfaces of the first disc member; and
a second disc member comprising a flat portion, a dimple extending from the flat portion, a plurality of orifices defined through the dimple, the dimple of the second disc member including a convex surface and a concave surface disposed on opposed sides of the second disc member, the second disc member comprising a plurality of channels defined along the concave surface of the second disc member, the plurality of orifices are located in the channels,
wherein the first disc and the second disc are coupled together such that convex surface of the first disc member contacts the concave surface of the second member and the flat portion of the first disc member contacts the flat portion of the second disc member,
wherein the dimple of the first disc member comprises a portion having a frusto-conical shape and the dimple of the second disc member comprises a cone shape, and each channel of the second disc member is disposed along the cone shape, and
wherein each channel comprises a U-shape having two end portions which comprise a second portion of the channel, the orifice located in the channel is located an equal distance to each end portion thereof, and the channels are spaced apart from and unconnected to each other.

8. The spray disc assembly of claim 7, wherein the dimple of the first disc member covers a first portion of each channel of the second disc member and the orifice of the first disc member overlays the second portion of each channel of the second disc member leaving the second portion of each channel uncovered, and each orifice of the second disc member is located in the first portion of a corresponding channel.

9. The spray disc assembly of claim 8, wherein each channel comprises two longitudinal ends located in the second portion of the channel, and the orifice located in the first portion of the channel is located an equal distance to the longitudinal ends of the channel.

10. The spray disc assembly of claim 8, wherein for each channel, a depth of the first portion of the channel is greater than a depth of the second portion thereof.

* * * * *